United States Patent
Fan et al.

(10) Patent No.: US 7,443,682 B2
(45) Date of Patent: Oct. 28, 2008

(54) COMPUTER SYSTEM

(75) Inventors: Chen-Lu Fan, Taipei Hsien (TW);
Chia-Kang Wu, Taipei Hsien (TW);
Wen-Tzu Chen, Taipei Hsien (TW);
Li-Ping Chen, Taipei Hsien (TW)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/753,584

(22) Filed: May 25, 2007

(65) Prior Publication Data
US 2008/0218962 A1    Sep. 11, 2008

(30) Foreign Application Priority Data
Mar. 6, 2007    (CN) .................... 2007 2 0200122 U

(51) Int. Cl.
*H05K 7/20* (2006.01)
*F28F 7/00* (2006.01)

(52) U.S. Cl. .................. 361/709; 361/704; 361/719; 165/80.3; 165/185

(58) Field of Classification Search ................ 361/704, 361/709–710, 719; 165/104.33, 185; 174/16.3; 248/505, 510
See application file for complete search history.

(56) References Cited

U.S. PATENT DOCUMENTS

| 6,249,428 | B1 * | 6/2001 | Jeffries et al. ............... 361/684 |
| 6,424,527 | B1 * | 7/2002 | Bailey et al. ................ 361/687 |
| 6,542,366 | B2 * | 4/2003 | Davis et al. ................. 361/703 |
| 6,639,804 | B1 * | 10/2003 | Chen .......................... 361/719 |
| 6,717,815 | B2 * | 4/2004 | Yang .......................... 361/719 |
| 6,885,557 | B2 * | 4/2005 | Unrein ........................ 361/704 |
| 7,042,727 | B2 * | 5/2006 | Ulen et al. ................... 361/704 |
| 7,142,427 | B2 * | 11/2006 | Reents ........................ 361/704 |
| 7,254,028 | B2 * | 8/2007 | Lee et al. .................... 361/704 |
| 7,342,809 | B2 * | 3/2008 | Chen et al. .................. 361/801 |

* cited by examiner

*Primary Examiner*—Jayprakash N Gandhi
*Assistant Examiner*—Robert J Hoffberg
(74) *Attorney, Agent, or Firm*—Frank R. Niranjan

(57) ABSTRACT

A computer system includes a chassis (10), a securing panel (30), a motherboard (20), and a heat sink (40). The chassis includes a plate (12) having at least one positioning post (14) extending upwardly therefrom. The securing panel defines a plurality of screw holes (38) and at least one positioning hole (34) for the at least one positioning post extending therethrough. The motherboard is placed on the securing panel and secured with the chassis. The motherboard includes a plurality of through holes (22) corresponding to the plurality of screw holes of the securing panel and an electronic component (50) located among the through holes. The heat sink with a plurality of fastening bolts (42) placed on the electronic component. The fastening bolts of the heat sink are screwed into the through holes of the motherboard and the screw holes of the securing panel to fasten the securing panel and the heat sink at opposite sides of the motherboard.

9 Claims, 4 Drawing Sheets

COMPUTER SYSTEM

BACKGROUND OF THE INVENTION

1. Field of the Invention

The present invention relates to computer systems, and more particularly to a computer system with a securing apparatus for a heat sink.

2. Description of Related Art

Conventionally, a heat sink, for dissipating heat generated from an electronic component, is secured onto the electronic component by a securing apparatus. A securing apparatus includes a locking device and a back plate unit for cooperatively mounting a heat sink to an electronic component. The locking device includes a retention module located around the electronic component for supporting the heat sink thereon, and a clip pivotably attached to the retention module. The clip is pivotable between a first position in which the clip presses the heat sink toward the electronic component and a second position in which the clip pushes the heat sink in a direction away from the electronic component. However, the securing apparatus has a complicated configuration.

What is needed, therefore, is a computer system having a securing apparatus with a simple structure for a heat sink.

SUMMARY OF THE INVENTION

A computer system includes a chassis having at least a positioning post extending upwardly, a securing panel with at least a plurality of screw holes and at least a positioning hole for the at least positioning post extending therethrough, a motherboard with at least a plurality of through holes defined therein corresponding to the screw holes of the securing panel, and a heat sink with a plurality of fastening bolts. The fastening bolts of the heat sink are screwed into the through holes of the motherboard and the screw holes of the securing panel. The securing panel and the heat sink are attached to the motherboard at opposite sides thereof.

Other advantages and novel features of the present invention will become more apparent from the following detailed description of preferred embodiment when taken in conjunction with the accompanying drawings, in which:

DETAILED DESCRIPTION OF THE INVENTION

Figure 1:
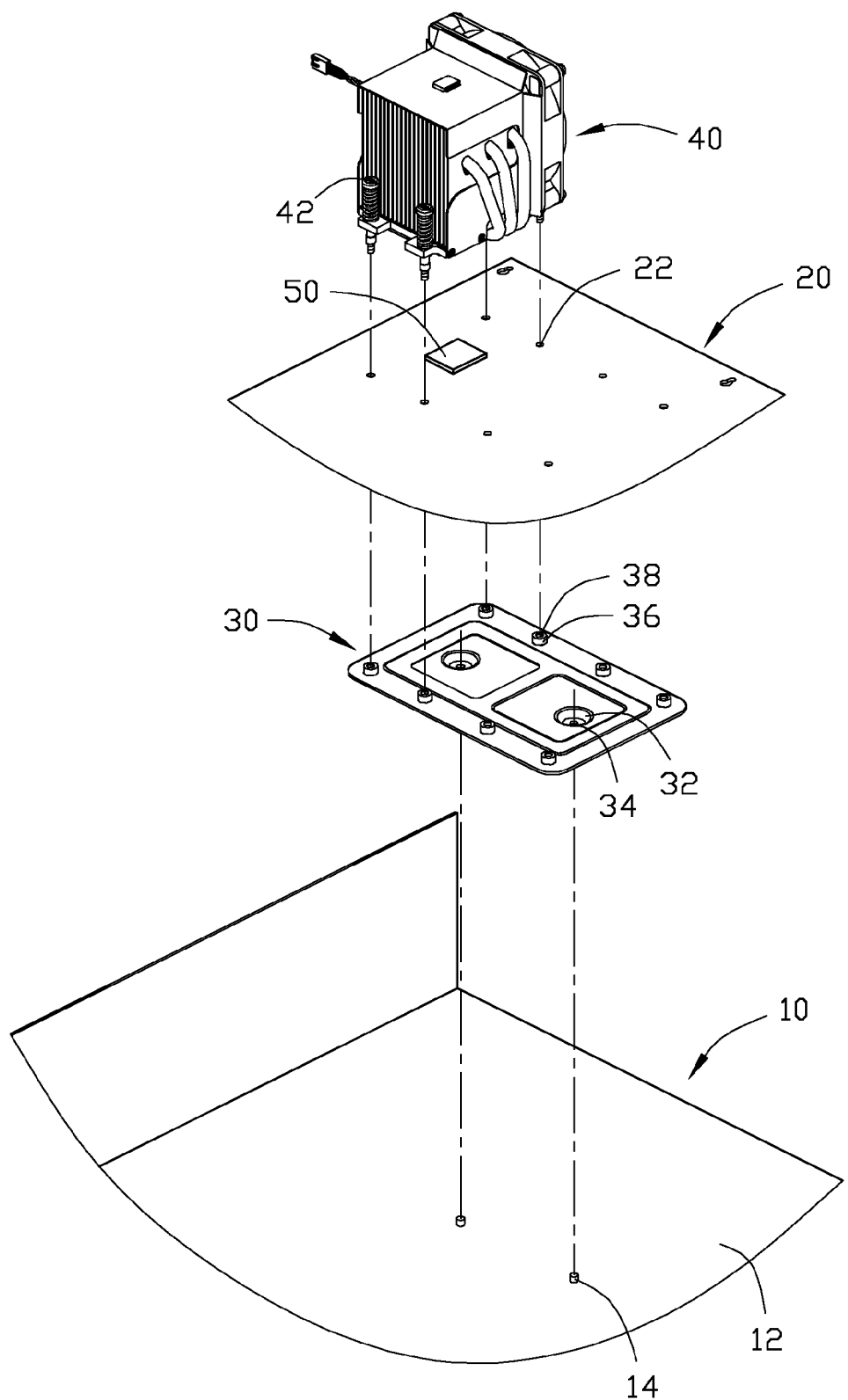
FIG. 1 is an exploded, isometric view of a computer system in accordance with a preferred embodiment of the present invention, the computer system including a chassis, a securing panel, a motherboard, and a heat sink.

Referring to FIG. 1, a computer system in accordance with the preferred embodiment of the present invention includes a chassis 10, a motherboard 20, a securing panel 30, and a heat sink 40.

The chassis 10 includes a bottom plate 12 with a pair of positioning posts 14 formed on an inner surface thereof.

The motherboard 20 which is configured to be fastened to the inner surface of the bottom plate 12 of the chassis 10, defines two rows of through holes 22 among which an electronic component 50 is mounted.

The rectangular securing panel 30 defines a pair of concave portions 32, and two rows of protrusions 36 extending upwards from the upper surface of the securing panel 30. Each protrusion 36 defines a screw hole 38 therein corresponding to one of the through holes 22 of the motherboard 20. Each concave portion 32 is in an inverse circular truncated cone shape. A positioning hole 34, corresponding to the positioning post 14 of the chassis 10, is defined in the center of a bottom plate of each concave portion 32.

The heat sink 40, mounted on the electronic component 50 of the motherboard 20, includes four fastening bolts 42 attached in four corners thereof corresponding to the through holes 22 of the motherboard 20.

Figure 2:
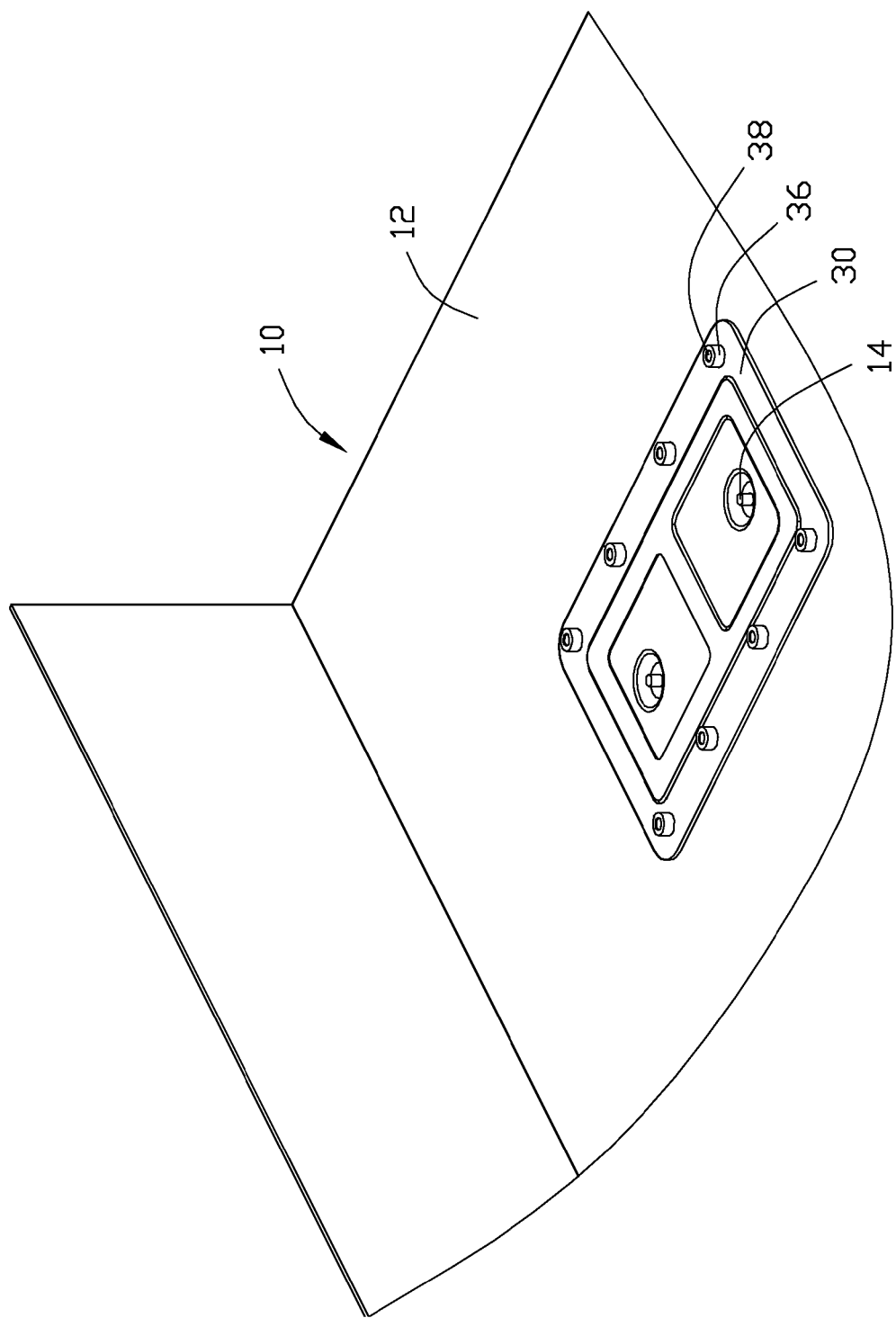
FIG. 2 is an assembled view of the securing panel and the chassis in FIG. 1.

Referring to FIG. 2, the positioning posts 14 of the chassis 10 are inserted into the positioning holes 34 of the securing panel 30. The bottom surface of the concave portions 32 abut against the inner surface of the bottom plate 12 of the chassis 10 and keep a distance between the bottom plate 12 and the securing panel 30. The securing panel 30 is located on the bottom plate 12 of the chassis 10.

Figure 3:
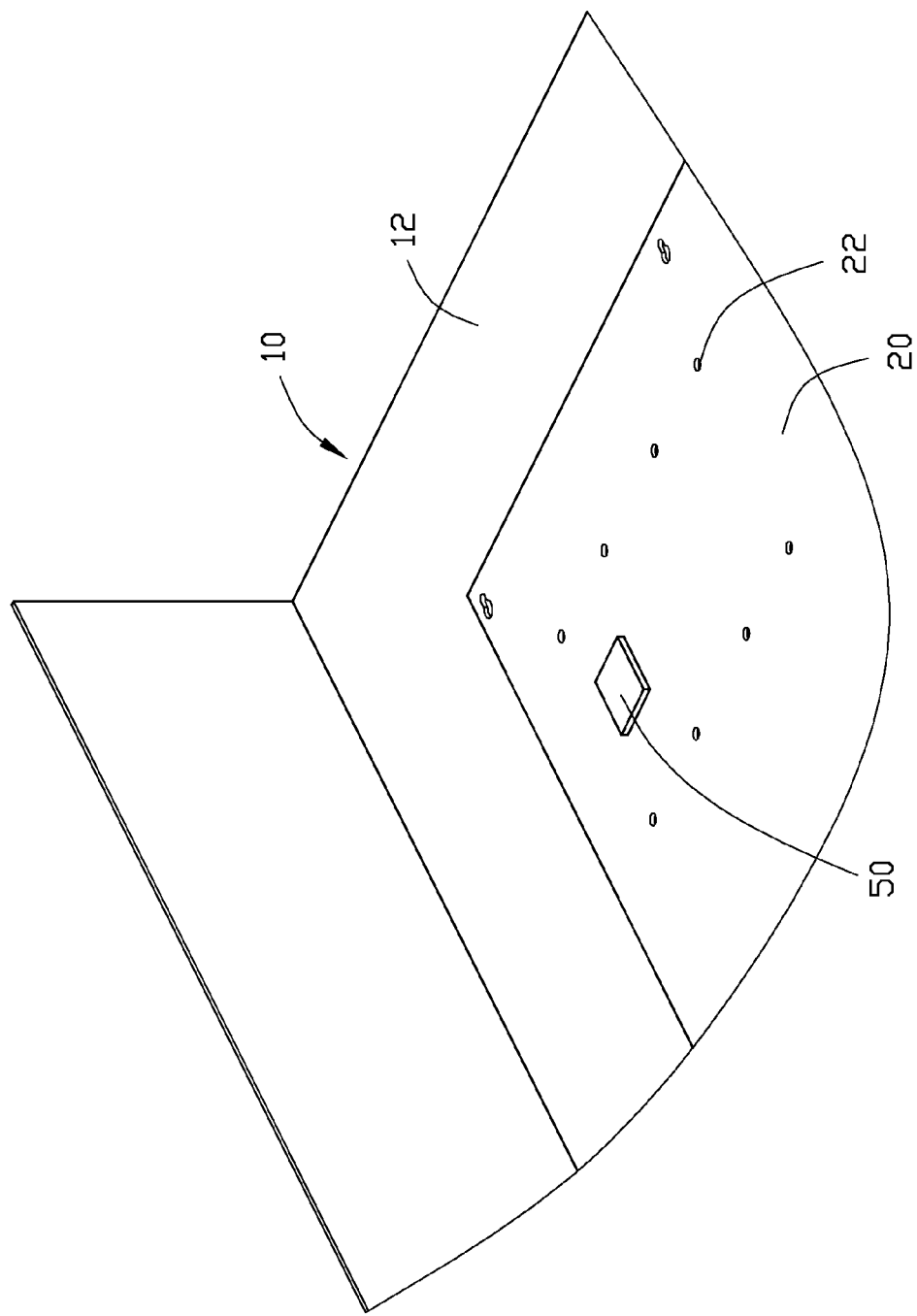
FIG. 3 is an assembled view of the motherboard, the securing panel, and the chassis in FIG. 1.
Figure 4:
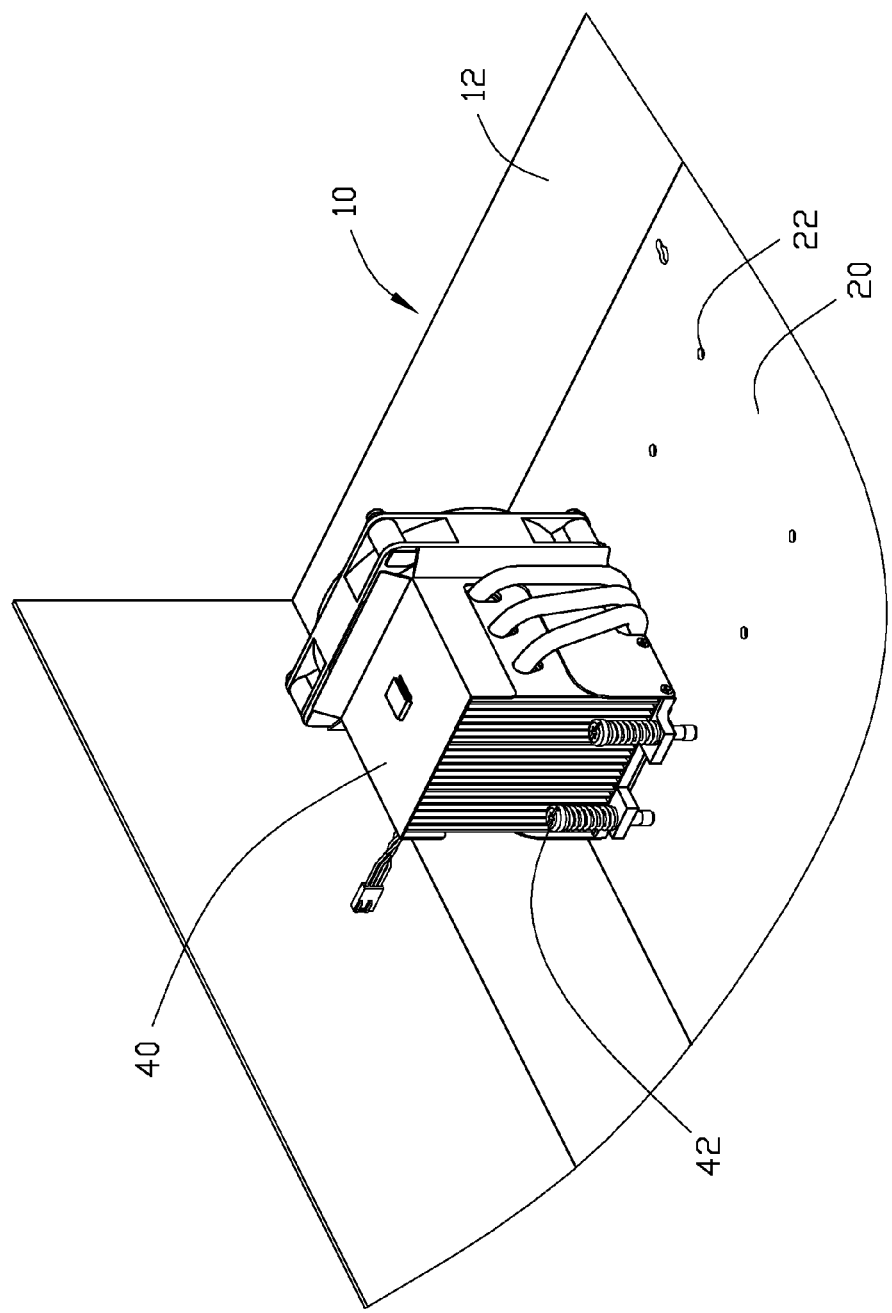
FIG. 4 is an assembled view of FIG. 1.

Referring to FIG. 3, the motherboard 20 is securely fastened on the inner surface of the bottom plate 12 of the chassis 10 with the securing panel 30 sandwiched therebetween. The protrusions 36 abut against the bottom surface of the motherboard 20 and keep a distance between the motherboard 20 and the securing panel 30. The through holes 22 of the motherboard 20 align with the screw holes 38 of the securing panel 30. The fastening bolts 42 of the heat sink 40 are screwed into the through holes 22 of the motherboard 20 and the screw holes 38 of the securing panel 30 to secure the heat sink 40 to the motherboard 20, as best shown in FIG. 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer system, comprising:
   a chassis comprising a plate having at least one positioning post extending upwardly therefrom;
   a securing panel with a plurality of screw boles mounted on the plate, the securing panel defining at least one positioning hole for the at least one positioning post extending therethrough;
   a motherboard placed on the securing panel and secured with the chassis, the motherboard comprising a plurality of through holes corresponding to the plurality of screw holes of the securing panel and an electronic component located among the through holes; and
   a heat sink with a plurality of fastening bolts placed on the electronic component, the fastening bolts screwed into the through holes of the motherboard and the screw holes of the securing panel respectively to fasten the securing panel and the heat sink at opposite sides of the motherboard;
   wherein the securing panel comprises at least one concave portion with the at least one positioning hole defined therein, the at least one positioning post entering into the at least one positioning hole.

2. The computer system as described in claim 1, wherein the at least one concave portion is in an inverse circular truncated cone shape, the at least one positioning hole defined in the center of a bottom plate of the at least one concave portion.

3. The computer system as described in claim 2, wherein the bottom plate of the at least one concave portion abuts against the plate of the chassis and keeps a distance between the plate and the securing panel.

4. The computer system as described in claim 1, wherein the securing panel comprises a plurality of protrusions extending upwards Therefrom, and each screw hole of the securing panel is defined in one corresponding protrusion of the securing panel respectively, the protrusions abutting against the motherboard and keeping a distance between the motherboard and the securing panel.

5. A computer system, comprising:
a chassis with a bottom plate;
a securing panel with a plurality of screw holes defined therein, the securing panel located on an inner surface of the bottom plate of the chassis and being parallel to the bottom plate;
a motherboard with a plurality of through holes defined therein corresponding to the screw holes of the securing panel, the motherboard disposed above the securing panel; and
a heat sink with a plurality of fastening bolts, the fastening bolts of the heat sink screwed into the through holes of the motherboard and the screw holes of the securing panel to fasten the securing panel and the heat sink at opposite sides of the motherboard;
wherein at least one positioning post extends upwards from the inner surface of the bottom plate of the chassis, and at least one positioning hole is defined in the securing panel corresponding to the at least one positioning post of the chassis;
wherein the securing panel comprises at least one concave portion with the at least one positioning hole defined therein, the at least one concave portion receiving the at least one positioning post.

6. The computer system as described in claim 5, wherein the at least one concave portion is in an inverse circular truncated cone shape, the at least one positioning hole defined in the center of a bottom portion of the at least one concave portion.

7. The computer system as described in claim 6, wherein the bottom portion of the at least one concave portion abuts against the bottom plate of the chassis and keeps a distance between the chassis and the securing panel.

8. The computer system as described in claim 5, wherein the securing panel comprises protrusions extending upwards therefrom, and each screw hole of the securing panel is defined in one corresponding protrusion of the securing panel, the protrusions abutting against the motherboard and keeping a distance between the motherboard and the securing panel.

9. A computer system comprising:
a chassis comprising a plate;
a motherboard mounted on the plate, the motherboard comprising a plurality of through holes and an electronic component located among the through holes;
a securing panel sandwiched between the motherboard and the plate, the securing panel comprising a first surface facing the motherboard and a second surface facing the plate and opposing the first surface, a plurality of protrusions extending from the first surface and abutting against the motherboard, each of the protrusions defining a screw hole corresponding to one of the through holes, at least one concave portion sunken from the first surface and projecting from the second surface to abut against the plate; and
a heat sink placed on the electronic component, a plurality of fasteners extending through the heat sink and the through holes of the motherboard to engage in the corresponding screw holes of the securing panel to thereby fasten the heat sink and the securing panel at opposite sides of the motherboard;
wherein the at least one concave portion defines a through hole, and at least one positioning post extends from the plate, the at least one positioning post extending through the through hole to be received within the at least one concave portion.

* * * * *